United States Patent

Stache et al.

[11] 3,914,213
[45] Oct. 21, 1975

[54] CARDENOLIDO-3-[4'-AMINO-2', 3', 4'-TRIDESOXY-GLYCOSIDES] AND PROCESS FOR THEIR MANUFACTURE

[75] Inventors: Ulrich Stache, Hofheim; Werner Fritsch, Neuenhain; Werner Haede, Hofheim; Ernst Lindner, Frankfurt am Main, all of Germany

[73] Assignee: Hoechst Aktiengesellschaft, Frankfurt am Main, Germany

[22] Filed: Nov. 1, 1973

[21] Appl. No.: 411,747

[30] Foreign Application Priority Data
Nov. 4, 1972 Germany............................ 2254060

[52] U.S. Cl.............................. 260/210.5; 424/182
[51] Int. Cl.².......................................... C07J 17/00
[58] Field of Search................................. 260/210.5

[56] References Cited
UNITED STATES PATENTS 3,471,470  10/1969  Heider et al...................... 260/210.5
3,838,146  9/1974   Stache et al...................... 260/210.5

OTHER PUBLICATIONS

Ginsberg, D., Concerning Amines, p. 53, 1964, Pergman Press, New York.
Smith, P. A. S., Open–Chain Nitrogen Cpds., Vol. I, p. 65, W. A. Benjamin Inc., New York.
Fieser & Fiester, Steriods, p. 254, 1959, Reinhold Publ. Co., New York.

Primary Examiner—Johnnie R. Brown
Assistant Examiner—Cary B. Owens
Attorney, Agent, or Firm—Curtis, Morris & Safford

[57] ABSTRACT

Cardenolido-3-[4'-amino-2', 3', 4'-tridesoxy-glycosides] of the general formula

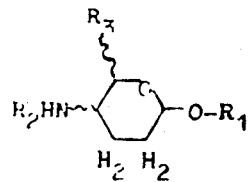

wherein $R_1$ stands for a steroid radical of the 3-hydroxycardenolide series, $R_2$ stands for hydrogen, lower alkyl, alkenyl, cycloalkyl, phenyl, benzyl, phenylethyl, lower aliphatic acyl, or one of the acid radicals of benzoic acid, cinnamic acid or cyclohexane-carboxylic acid, and $R_3$ stands for methyl, the $CH_2OR_2$-group or hydrogen, and a process for their preparation are described. The compounds have valuable pharmaceutical properties.

11 Claims, No Drawings

CARDENOLIDO-3-[4'-AMINO-2', 3', 4'-TRIDESOXY-GLYCOSIDES] AND PROCESS FOR THEIR MANUFACTURE

The present invention relates to cardenolido-3-[4'-amino-2', 3', 4'-tridesoxy-glycosides] and to a process for their manufacture.

According to Bull. Soc. Chim. France 1971, page 864, 3'-methoxy-4'-amino-glyco-cardenolides are known to have a possible cytostatic activity. However, cardenolido-4'-amino-glycosides carrying unsubstituted methylene in the 2'-and 3'-positions, especially those having cardiac activity, have as yet not been disclosed.

This invention now provides cardenolido-3-[4'-amino-2', 3', 4',-tridesoxy-glycosides] of the formula I

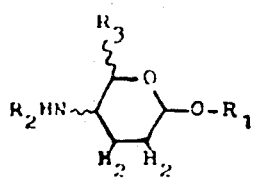

in which $R_1$ stands for a steroid radical of the 3-hydroxycardenolide series, $R_2$ stands for hydrogen or alkyl having 1 to 4 carbon atoms, alkenyl having 2 to 4 carbon atoms, cycloalkyl having 3 to 7 carbon atoms, phenyl, benzyl, phenylethyl, aliphatic acyl having 1 to 4 carbon atoms, or one of the radicals of benzoic acid, cinnamic acid or cyclohexanecarboxylic acid, and $R_3$ stands for methyl, the $-CH_2OR_2$ group or hydrogen.

The present invention moreover relates to a process for the manufacture of cardenolido-3-[4'-amino-2', 3', 4'-tridesoxy glycosides] of the above-specified formula I, which comprises reacting a cardenolido-3-[2', 3'-didesoxy-glycoside] of the formula II

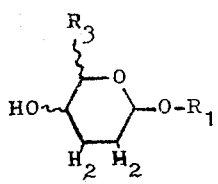

in which $R_1$ and $R_3$ are defined as above, with an alkyl- or aryl-sulfonic acid halide of the formula III $$R_4 - SO_2 - Hal$$

III in which $R_4$ stands for alkyl having 1 to 4 carbon atoms, cycloalkyl having 3 to 9 carbon atoms, phenyl, phenyl or benzyl each substituted by one, two or thre methyl groups, in the presence of a tertiary organic base and, preferably, in an inert solvent to yield the corresponding sulfonic acid ester of the formula IV

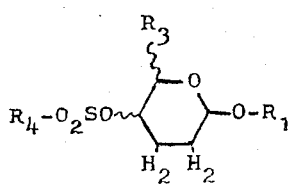

in which $R_1$, $R_3$ and $R_4$ are defined as above, reacting the compound of the formula IV with an alkali metal azide in an aprotic inert solvent at a temperature of from 0°C to the boiling point of the reaction mixture used, to yield the corresponding azide of the formula V

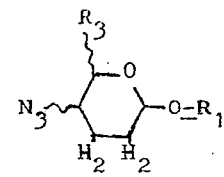

in which $R_1$ and $R_3$ are defined as above, the substituent in 4'-position being reversed according to Walden, hydrogenating the azide of the formula V in the presence of a metal catalyst in an inert solvent to yield the corresponding amine, and where required, alkylating or acylating, according to the definition of $R_2$, the compound of the formula I thus obtained, having a free amino group, and/or a compound of the formula I, in which $R_3$ stands for $-CH_2OH$, or where required, deacylating a compound of the formula I, in which $R_3$ stands for $-CH_2O$-acyl, by means of an alkaline agent.

As starting material may, for example, by mentioned the following cardenolido-3-[2', 3'-didesoxy-glycosides] which may be prepared according to the process disclosed in German Offenlegungsschrift No. 1,943,901 and whose steroid radicals $R_1$ in formula I are preferred:

Digotoxigenin-, gitoxigenin-, digoxigenin-, periplogenin-, 19-carobxy-methylene-periplogenin-5β-lactone-, 19-cyano-methylene-periplogenin-, uzarigenin-, K-strophanthidin-, K-strophanthidole-, ouabagenin- or oleandrigenin-3-[2', 3'-didesoxy-glycosides]of the above-cited formula II.

The glycoside moiety of these compounds is based on glucose, rhamnose, arabinose, xylose or mannose, preferably on glucose and rhamnose, this latter both in the α-L-and α-D-form. In the glycoside moiety, the radical $R_2$ in the above formula II may, for example, have the following meanings:

Hydrogen, methyl, ethyl, propyl, propenyl, cyclohexyl, phenyl, benzyl, formyl, acetyl, propionyl, butyryl, benzoyl, cinnamoyl or cyclohexoyl.

In the first reaction step II → IV, methane-sulfonic acid chloride, p-toluene-sulfonic acid chloride and brosyl chloride are preferably used as sulfonic acid halides.

In the first reaction step, the starting cardenolide is dissolved in a tertiary organic base, such as pyridine, quinoline, collidine, triethylamine or N-diethyl-aniline, where required with the addition of an inert organic solvent, such as tetrahydrofuran, dioxan, toluene or benzene. To this mixture, the alkyl- or aryl-sulfonic acid chloride, advantageously in admixture with the tertiary organic base or with the solvent, is added dropwise. The reaction mixture is then stirred at a preferable temperature of −20° to +60°C and then worked up in the usual manner, for example by pouring it into water and suction filtering or extracting the sulfonic acid ester with a solvent which is not miscible with water, such as chloroform or methylene chloride.

In the second reaction step IV → V, sodium azide, potassium azide or lithium azide are preferably used as azides. The cardenolide and the alkali metal azide are dissolved or suspended in a polar aprotic solvent, preferably dimethylformamide, dimethylsulfoxide or N,N,-N,N,N,N-hexamethylphosphoric acid triamide, and the reaction mixture is treated over a period of 10 minutes to 24 hours at a temperature of from 0° to the boiling point of the reaction mixture. The reaction product is worked up in the usual manner, for example by pouring it into water and suction-filtering or extracting it in the same manner as disclosed for the first step.

In the third reaction step V → I, the following catalysts are, for example, used for the catalytic hydrogenation of the azide compound: palladium, platinum, rhodium, zinc, nickel or iridium catalysts, or mixtures of these catalysts, preferably palladium catalysts, for example palladium black or palladium on barium carbonate or strontium carbonate.

As solvents suitable for the catalytic hydrogenation, there are mentioned, for example, methylene chloride, chloroform, dichloroethane, tetrahydrofuran, dioxan, methanol, ethanol, propanol, benzene, toluene or mixtures of these solvents.

Catalytic hydrogenation is carried out according to usual methods at normal pressure or an excess pressure of up to about 50 atmospheres gauge at a temperature of 0° to 70°C, preferably 20° to 50°C, in an apparatus suitable for catalytic hydrogenation. Infrared spectroscopic checking of samples that have been taken from the hydrogenation vessel permits determining when hydrogenation has come to an end. After the characteristic infrared band of the azide group at about 2090 cm$^{-1}$ has entirely disappeared, hydrogenation is complete.

The catalyst is then separated from the reaction solution by filtration, the filtrate is concentrated and the residue is recrystallized from a suitable solvent, for example from a high-boiling ether and/or acetone.

If the cardenolido-2′, 3′, 4′-tridesoxy-glycosides thus obtained contain ester groups in their glycoside moiety, these may be converted into free alcohol groups by the usual hydrolysis, for example with ammonia in methanol or potassium carbonate in alcohol/water.

The free amino group in 4′-position may be acylated, where required, for example by a reaction with carboxylic acid anhydrides or halides according to the Schotten-Baumann method. It may also be alkylated, for example by a reaction with alkyl halides in the presence of silver compounds or alkali metal or alkaline earth metal salts.

It is a surprising fact that catalytic hydrogenation of the 4′-azide group to the 4′-amino group takes place so preferably prior to hydrogenation of the 20(22)-double bond that a selective hydrogenation provides the products of the invention in good yields. For it is known that the double bond of the 17β-butenolide ring is hydrogenated under similar conditions (cf. Fieser "Steroide", Weinheim/Bergstrasse 1961, pages 811 et seq.).

The cardenolido-3-[4′-amino-2′, 3′, 4′-tridesoxy-glycosides] according to the invention have valuable pharmaceutical properties. For example, they show cardiotonic efficacy, especially a high positively inotropic activity which has been tested on an isolated atrium of a guinea pig's heart or by potassium excretion on an isolated guinea pig's heart. The compounds according to the invention are therefore suitable for the treatment of cardiac insufficiency. Moreover, they exhibit a cytostatic effect and may therefore be used for treating tumors.

The novel compounds are predominantly used as orally administrable therapeutics in the form of tablets, capsules, dragées, to which the usual pharmaceutical carriers, for example starch, lactose, tragacanth, magnesium stearate and talcum, may be admixed. For intravenous injections, water or a physiological sodium chloride solution is used.

The individual dosage to be administered to human beings is in the range of from about 0.5 mg to 5 mg per dosage unit form.

The following Examples serve to illustrate the invention.

EXAMPLE 1

Digitoxigenin-3-L-[2′, 3′-didesoxy-rhamnopyranosido-—4′-p-toluene-sulfonate]

A solution of 1.7 g of p-toluene-sulfonic acid chloride in 19.7 ml of pyridine was added dropwise while stirring at 0°C to a solution of 2.44 g of digitoxigenin-3-L-[2′, 3′-didesoxy-rhamnoside] (prepared according to German Offenlegungsschrift No. 1,943,901). Stirring was continued for 20 hours at room temperature and the reaction mixture was poured into 200 ml of water. After having been allowed to stand for 1 to 2 days, the supernatant material was decanted off from the precipitate, the precipitate was taken up in methylene chloride, washed with water, dried and concentrated under reduced pressure. The foamy substance obtained was crystallized from diisopropyl ether.

Yield: 2.6 grams of digitoxigenin-3-L-[2′, 3′-didesoxy-rhamno-pyranosido-4′-p-toluene-sulfonate], Melting point: 120°–121°C.

Characteristic infrared bands (in KBr): 3500, 1780, 1755, 1740, 1620, 1595, 1490, 1360, 1190, 1175, 1030, 995, 960, 835, 810 cm$^{-1}$.

In the same manner as disclosed above, K-strophanthidin-3-L-[2′, 3′-didesoxy-rhamnopyranosido-4′-p-toluene-sulfonate] was obtained from K-strophanthidin-3-L-[2′, 3′-didesoxy-rhamnoside], (19-carboxymethylene-periplogenin-5β-lactone-3-L-[2′,3′-didesoxy-rhamnopyranosido-p-toluene-sulfonate] was obtained from (19-carboxymethylene-periplogenin-5β-lactone)-3-L-[2′, 3′-didesoxy-rhamnoside], uzarigenin-3-L-[2′, 3′-didesoxy-rhamnopyranosido-p-toluene-sulfonate] was obtained from uzarigenin-3-L-[2′, 3′-didesoxy-rhamnoside].

EXAMPLE 2

Digitoxigenin-3-L-[2′, 3′, 4′-tridesoxy-rhamnopyranosido-4′α-azide]

A solution of 1.28 g of digitoxigenin-3-L-[2′, 3′-didesoxy-rhamnopyranosido-4′-p-toluene-sulfonate] in 32.2 ml of N,N,N,N,N,N-hexamethyl-phosphoric acid triamide was combined with 3.25 g of sodium azide, and the mixture was stirred for 3 hours at 90°C under an atmosphere of nitrogen. The reaction mixture was then poured into 300 ml of water containing sodium chloride, the precipitate was suction-filtered and dried under reduced pressure over phosphorus pentoxide.

1.3 g of digitoxigenin-3-L-[2′, 3′, 4′-tridesoxy-rhamnopyranosido-4′α-azide] were obtained, m.p. 102°–106°C.

Characteristic infrared bands (in KBr): 3480, 2095 (very pronounced), 1780, 1740, 1620, 1020, 990 cm$^{-1}$.

In the same manner as disclosed above, the 4'-p-toluene-sulfonates mentioned at the end of Example 1 were used to prepare: K-strophanthidine-3-L-[2', 3', 4'-tridesoxy-rhamnopyranosido-4'α-azide], (19-carboxymethylene-periplogenin-5β-lactone)-3-L-[2', 3'-didesoxy-rhamnopyranosido-4'α-azide] and uzarigenin-3-L-[2', 3'-didesoxy-rhamnopyranosido-4'-α-azide].

EXAMPLE 3

Dixitoxigenin-3-L-[2', 3', 4'-tridesoxy-4'α-amino-rhamnoside]

1.75 g of digitoxigenin-3-L-[2', 3'-didesoxy-rhamnopyranosido-4'α-azide] were dissolved in 140 ml of ethanol and the solution was catalytically hydrogenated with 710 mg of 10 % Pd/CaCO₃ (prehydrogenated in 50 ml of ethanol). The hydrogenation procedure was controlled by infrared spectroscopy. After the azide band at 2100⁻¹ had disappeared, hydrogenation was discontinued. The catalyst was separated from the reaction solution by filtration, the solution was concentrated under reduced pressure and the foamy substance obtained was crystallized by means of diisopropyl ether. 1.52 g of digitoxigenin-3-L-[2', 3', 4'-tridesoxy-4'α-amino-rhamnoside] were obtained, m.p. 121°–128°C (not typical).

Characteristic infrared bands (in KBr): 3450, 3260, 3180, 1780, 1740, 1620, 1010, 980 cm⁻¹.

Ultraviolet spectrum (in methanol): λmax = 217–218 mμ, ε = 16800.

In the same manner as disclosed above, the 4'α-azides obtained at the end of Example 2 were used to prepare: K-strophanthidin-3-L-[2', 3', 4'-tridesoxy-4'α-amino-rhamnoside], (19-carboxymethylene-periplogenin-5β-lactone)-3-L-[2', 3', 4'-tridesoxy-4'α-amino-rhamnoside] and uzarigenin-3-L-[2', 3', 4'-tridesoxy-4'α-amino-rhamnoside].

EXAMPLE 4

Digitoxigenin-3-L-[2', 3', 4'-tridesoxy-4'α-acetamino-rhamnoside]

2 ml of acetic acid anhydride were added to a solution of 750 mg of digitoxigenin-3-L-[2', 3', 4'-tridesoxy-4'α-amino-rhamnoside] in 2 ml of pyridine, and the mixture was allowed to stand for 18 hours at 20°C. The reaction mixture was then poured into 50 ml of water containing sodium chloride, the liquid was filtered from the oily substance which had precipitated, this substance was taken up in methylene chloride, washed with water, dried, and the solvent was distilled off. The foamy substance obtained was crystallized from diisopropyl ether in a yield of 524 mg of digitoxigenin-3-L-[2', 3', 4'-tridesoxy-4'α-acetamino-rhamnoside]. After recrystallization from acetone/ether, the compound melted at 278°–280°C.

Characteristic infrared bands (in KBr): 3440, 3320, 1780, 1740, 1650, 1620, 1530, 1010, 960 cm⁻¹.

EXAMPLE 5

Digitoxigenin-3-D-[2', 3'-didesoxy-xylosido-4'-p-toluene-sulfonate]

In the manner disclosed in Example 1, 2.44 g of digitoxigenin-3-D-[2', 3'-didesoxy-xyloside] were reacted with p-toluene-sulfonic acid chloride and the reaction product was likewise worked up, yielding digitoxigenin-3-D-[2', 3'-didesoxy-xylosido-4'-p-toluene-sulfonate], m.p. 110°–116°C.

Characteristic infrared bands (in KBr): 3480, 1780, 1755, 1740, 1620, 1590, 1490, 1360, 1190, 1170, 1025, 990, 960 cm⁻¹.

EXAMPLE 6

Digitoxigenin-3-D-[2', 3', 4'-tridesoxy-xylosido-4'α-azide]

1.2 g of digitoxigenin-3-D-[2', 3'-didesoxy-xylosido-4'-p-toluene-sulfonate] were reacted with sodium azide and worked up as disclosed in Example 2. Digitoxigenine-3-D-[2', 3', 4'-tridesoxy-xylosido-4'α-azide] was obtained, m.p. 98°–103°C.

The infrared spectrum showed a pronounced band for azide at 2095–2100 cm⁻¹.

EXAMPLE 7

Digitoxigenin-3-D-[2', 3', 4'-tridesoxy-4'α-amino-xyloside]

As disclosed in Example 3, 1.7 g of digitoxigenin-3-D-[2', 3', 4'-tridesoxy-xyloside-4'α-azide] were catalytically hydrogenated with Pd/CaCO₃ and worked up, yielding digitoxigenin-3-D-[2', 3', 4'-tridesoxy-4'-amino-xyloside] having characteristic bands for the amino group at 3260 and 3170 cm⁻¹. Ultraviolet spectrum: λmax. = 217 mμ, ε = 15700.

The starting compounds were prepared in the following manner:

Digitoxigenin-3-[2', 3'-didesoxy-Δ²⁽³'⁾-D-xylosido-4'-acetate]

1.8 ml of diacetyl-D-xylal and 0.07 ml of phosphoroxy chloride were added to a solution of 1.1 g of digitoxigenin in 9.6 ml of absolute tetrahydrofuran. After stirring had been continued for 5 hours at 20° to 25°C (care should be taken not to heat the reaction mixture above 40°C since undesired by-products which are difficult to separate may form, thus reducing the yield), the reaction mixture was poured into 50 ml of water containing excess sodium bicarbonate, the solution was exhaustively extracted with chloroform, the extracts were washed with water, dried and the solvents were distilled off under reduced pressure. A residue of about 2.5 g was obtained as an oil which gradually crystallized upon trituration with ether. The crystals were then suction-filtered and washed with a small amount of cold ether. 0.76 g of digitoxigenin-3-[2', 3'-didesoxy-Δ²'⁽³'⁾-D-xylosido-4'-acetate] was obtained, m.p. 127°–139°C (Kofler heating device).

Characteristic infrared bands (in KBr): 3500, 1780, 1750, 1730, 1620, 1230, 1020, 740 cm⁻¹.

Ultraviolet spectrum (in methanol): λmax = 216–217 m μ; ε=16200.

Digitoxigenin-3-D-[2', 3'-didesoxy-4'-O-acetyl-xyloside]

A solution of 3.7 g of digitoxigenin-3-D-[2', 3'-didesoxy-4'-O-acetyl Δ²'⁽³'⁾-xyloside] in 300 ml of ethanol was added to a preliminarily hydrogenated suspension of 1.5 g of palladium on calcium carbonate (10%) in 100 ml of ethanol, and the mixture was hydrogenated under normal pressure at 22°C. After 1 mol-equivalent of H₂ (= 155 ml) had been absorbed, hydrogenation came to a standstill. The catalyst was separated from the reaction solution by filtration and the filtrate was concentrated under reduced pressure. The oil obtained as a residue was crystallised from ether/n-hexane. 2.7 g of digitoxigenin-3-D-[2', 3'-didesoxy-4'-O-acetyl-rhamnoside] were obtained.

Characteristic infrared bands (in KBr): 3500, 1775, 1735 (broad), 1620, 1235, 1025, 990 cm$^{-1}$.

Digitoxigenin-3-D-[2', 3'-didesoxy-xyloside]

A solution of 660 mg of potassium bicarbonate in 6.6 ml of water was added to a solution of 2.2 g of digitoxigenin-3-D-[2', 3'-didesoxy-4'-O-acetyl-xyloside] in 70 ml of methanol and the mixture was refluxed for 25 minutes. After cooling, the reaction mixture was poured into 500 ml of water containing sodium chloride, the precipitate which had separated was suction-filtered, washed and dried. After recrystallization from acetone/ether, 1.2 g of digitoxigenin-3-D-[2', 3'-didesoxy-xyloside] were obtained.

Characteristic infrared bands (in KBr): 3400 (broad), 1780, 1720, 1620, 1090, 1015, 990 cm$^{-1}$.

Ultraviolet spectrum: $\lambda$max. = 217 m$\mu$; $\epsilon$ = 16100.

We claim:

1. A cardenolido-3-(4'-amino-2',3',4'-tridesoxyglycoside) of the formula

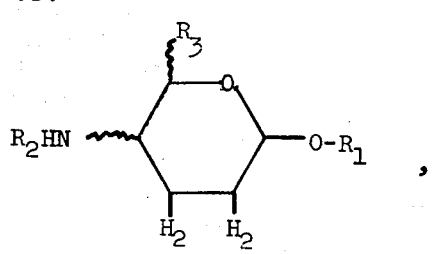

wherein $R_1$ stands for a steroid of the 3-hydroxy-cardenolide series, $R_2$ stands for hydrogen or alkyl having 1 to 4 carbon atoms, alkenyl having 2 to 4 carbon atoms, cycloalkyl having 3 to 7 carbon atoms, phenyl, benzyl, phenylethyl, aliphatic acyl having 1 to 4 carbon atoms, benzoyl, cinnamoyl, or cyclohexanecarboxylic, and $R_3$ stands for methyl, —$CH_3OR_2$, or hydrogen.

2. Digitoxigenin-3-L-[2', 3'-didesoxy-rhamnopyranosido-4'-p-toluene-sulfonate]

3. Digitoxigenin-3-L-[2', 3', 4'-tridesoxy-rhamnopyranosido-4'$\alpha$-azide]

4. Digitoxigenin-3-L-[2', 3', 4'-tridesoxy-4'$\alpha$-aminorhammoside]

5. Digitoxigenin-3-L-[2', 3', 4'-tridesoxy-4'$\alpha$-acetylamino-rhamnoside]

6. Digitoxigenin-3-D-[2', 3'-didesoxy-xylosido-4'-p-toluene-sulfonate]

7. Digitoxigenin-3-D-[2', 3', 4'-tridesoxy-xylosido-4'$\alpha$-azide]

8. Digitoxigenin-3-D-[2', 3', 4'-tridesoxy-4'$\alpha$-amino-xyloside]

9. K-Strophanthidin-3-[2', 3', 4'-tridesoxy-4'$\alpha$-aminorhamnoside]

10. (19-Carboxymethylene-periplogenin-5$\beta$-lactone)-3-L-[2', 3', 4'-tridesoxy-4'$\alpha$-amino-rhamnoside]

11. Uazarigenin-3-L-[2', 3', 4'-tridesoxy-4'$\alpha$-amino-rhamnoside]

* * * * *